(12) United States Patent
Shimizu (10) Patent No.: US 12,472,971 B2
(45) Date of Patent: Nov. 18, 2025

(54) DRIVING ASSISTANCE DEVICE

(71) Applicant: DENSO CORPORATION, Kariya (JP)

(72) Inventor: Naotsugu Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 146 days.

(21) Appl. No.: 18/399,355

(22) Filed: Dec. 28, 2023

(65) Prior Publication Data

US 2024/0140469 A1     May 2, 2024

Related U.S. Application Data

(63) Continuation of application No. PCT/JP2022/023490, filed on Jun. 10, 2022.

(30) Foreign Application Priority Data

Jul. 2, 2021    (JP) ................................ 2021-111035

(51) Int. Cl.
     *B60W 50/14*      (2020.01)
     *B60W 30/095*     (2012.01)
     *B60W 50/00*      (2006.01)

(52) U.S. Cl.
CPC ........ *B60W 50/14* (2013.01); *B60W 30/0956* (2013.01); *B60W 2050/0083* (2013.01); *B60W 2050/143* (2013.01); *B60W 2050/146* (2013.01); *B60W 2552/30* (2020.02); *B60W 2552/53* (2020.02); *B60W 2554/4041* (2020.02); *B60W 2556/20* (2020.02)

(58) Field of Classification Search
CPC .. B60K 35/29; B60K 35/28; B60K 2360/171; B60K 2360/1868; B60K 35/00; B60W 50/14; B60W 2050/146; B60W 2554/4041; B60W 2554/80; G08G 1/0108; G08G 1/0125; G08G 1/0137
See application file for complete search history.

(56) References Cited

U.S. PATENT DOCUMENTS

2021/0016791 A1*   1/2021   Elkins .................. B60W 50/16
2021/0300243 A1    9/2021   Shimizu et al.

* cited by examiner

*Primary Examiner* — Brian A Zimmerman
*Assistant Examiner* — Cal J Eustaquio
(74) *Attorney, Agent, or Firm* — Maschoff Brennan

(57) ABSTRACT

A driving assistance device includes: an object detecting part that detects an object behind and/or to the left and/or right rear of a host vehicle; an area setting part that sets a warning area behind and/or to the left or right rear of the host vehicle; a notification part that issues a notification when an object is detected within the warning area by the object detecting part; and an area changing part that calculates, based on a variation in curvature of a traveling trajectory of the host vehicle, an area reliable distance defining an area with high reliability, based on the area reliable distance, sets a reference position, and based on a lateral line extending in a turning radius direction of the host vehicle at the reference position, changes a rear end of the warning area.

6 Claims, 10 Drawing Sheets

DRIVING ASSISTANCE DEVICE

CROSS REFERENCE TO RELATED APPLICATIONS

This application is the U.S. bypass application of International Application No. PCT/JP2022/023490 filed on Jun. 10, 2022, which designated the U.S. and claims priority to Japanese Patent Application No. 2021-111035 filed on Jul. 2, 2021, and the contents of both of these are incorporated herein by reference.

BACKGROUND

Technical Field

The present disclosure relates to a driving assistance device that performs driving assistance based on information on objects detected around a vehicle.

Description of the Related Art

There are known techniques related to driving assistance based on information on objects detected around the host vehicle in which a warning area is set around the host vehicle, and a notification is issued when an object entering the warning area is detected. As an example of a technique, a driving assistance device is disclosed which sets a warning area on the left or right rear side of the host vehicle, narrows the warning area when the host vehicle makes a turn at an intersection and the driving assistance device determines that the host vehicle has started making a turn, and expands the warning area when it determines that the turn has been completed.

SUMMARY

A driving assistance device according to the present disclosure includes: an object detecting part that detects an object behind and/or to the left and/or right rear of a host vehicle; an area setting part that sets a warning area behind and/or to the left or right rear of the host vehicle; a notification part that issues a notification when an object is detected within the warning area by the object detecting part; and an area changing part that calculates, based on a variation in curvature of a traveling trajectory of the host vehicle, an area reliable distance defining an area with high reliability, the reliability indicating how well the traveling trajectory matches a course along a shape of a traveling path of the host vehicle, based on the area reliable distance, sets a reference position that is a position on the traveling trajectory of the host vehicle serving as a reference for changing the warning area, and based on a lateral line extending in a turning radius direction of the host vehicle at the reference position, changes a rear end of the warning area.

BRIEF DESCRIPTION OF THE DRAWINGS

The foregoing and other objects, features, and advantages of the present disclosure will be more clarified by the following detailed descriptions with reference to the accompanying drawings. In the accompanying drawings.

DETAILED DESCRIPTION OF THE PREFERRED EMBODIMENTS

There are known techniques related to driving assistance based on information on objects detected around the host vehicle in which a warning area is set around the host vehicle, and a notification is issued when an object entering the warning area is detected. For example, patent literature, JP 2020-67969A discloses a driving assistance device that sets a warning area on the left or right rear side of the host vehicle, narrows the warning area when the host vehicle makes a turn at an intersection and the driving assistance device determines that the host vehicle has started making a turn, and expands the warning area when it determines that the turn has been completed.

In the above-described patent literature, when a curve radius R of the host vehicle making a turn at an intersection stays below a threshold for a predetermined period of time or longer, it is determined that the host vehicle has started making a turn, and the warning area is narrowed. Due to this, the slower the vehicle speed when turning, the more easily it is determined that the host vehicle has started making a turn, and the faster the vehicle speed, the more easily it is determined that it has not started making a turn, which raises the concern that vehicle speed may affect the determination on whether the host vehicle has started making a turn. In addition, since it does not consider changing how the warning area is narrowed depending on whether it is located on the inner side (turn center side) or outer side of the host vehicle when turning, there was room to improve the narrowing of the warning area when the host vehicle makes a turn. Further, there was also concern that the warning area may be inappropriately set when the host vehicle does not travel along the shape of the traveling path, such as when it is changing lanes, parking, or stopping.

Hereinafter, with reference to the drawings, embodiments of the present disclosure will be described.

First Embodiment

Figure 1:
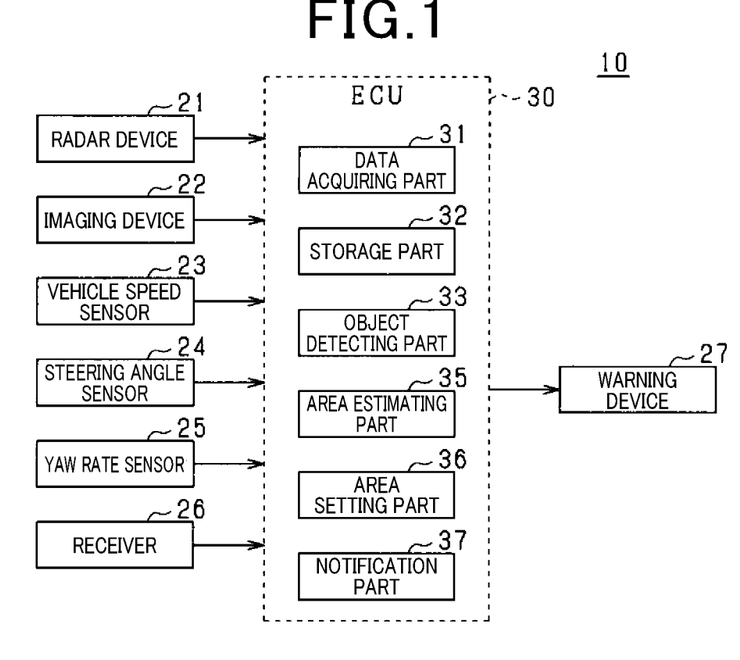
FIG. 1 is a block diagram illustrating a driving assistance device according to an embodiment.

As shown in FIG. 1, a driving assistance system 10 according to an embodiment includes radar devices 21, an imaging device 22, a vehicle speed sensor 23, a steering angle sensor 24, a yaw rate sensor 25, a receiver 26, a warning device 27, and an ECU 30.

The radar device 21 is a known millimeter wave radar, for example, that uses a high frequency signal in the millimeter waveband as transmission waves. The host vehicle may be provided with only one radar device 21 or a plurality of radar devices 21. For example, the radar devices 21 are disposed in the rear end part of the host vehicle to detect the positions of objects in a detection region, that is, an object-detectable area defined by a predetermined angle of view. Specifically, a probe wave is transmitted at a predetermined period, and reflected waves are received by a plurality of antennas. The radar devices 21 can calculate the distance to the object from the transmission time of search waves and the reception time of reflected waves. The radar devices 21 also calculate the relative speed of the object based on the frequencies of the reflected waves from the object, varied due to Doppler Effect. In addition, the radar devices 21 can calculate the azimuth of the object from phase differences in the reflected waves received by the plurality of antennas. When the position and azimuth of the object can be calculated, the position of the object relative to the host vehicle can be specified.

The imaging device 22 may be a single lens camera such as a CCD camera, a CMOS image sensor, or a near-infrared camera, or a stereo camera. The host vehicle may be provided with only one imaging device 22 or a plurality of imaging devices 22. The imaging device 22 is, for example, attached to the vehicle at a predetermined level and at the center of the vehicle in the lateral direction, and captures an image, which is converted to have a bird's eye viewpoint, of a region extending ahead of or behind the vehicle over a predetermined angular range. The imaging device 22 extracts feature points indicating the presence of the object in the captured image. Specifically, based on luminance information of the captured image, the imaging device extracts edge points and performs a Hough transform on the extracted edge points. In the Hough transform, for example, a point on a straight line on which edge points are continuously arranged or a point at which such straight lines intersect at a right angle with each other is extracted as the feature points. The imaging device 22 sequentially outputs the captured images it has sequentially captured to the ECU 30 as sensing information.

The radar devices 21 and the imaging device 22 are examples of surroundings monitoring devices that acquire information about the surroundings of the host vehicle. Examples of surroundings monitoring devices other than these include sensors that transmit probe waves such as ultrasonic sensors and LIDARs (Light Detection and Ranging/Laser Imaging Detection and Ranging). Sensors that transmit probe waves such as millimeter wave radars like the radar devices 21, sonars, and LIDARs sequentially sends to the ECU 30, as sensing information, scan results based on received signals obtained when receiving reflected waves reflected by an obstacle.

Figure 2:
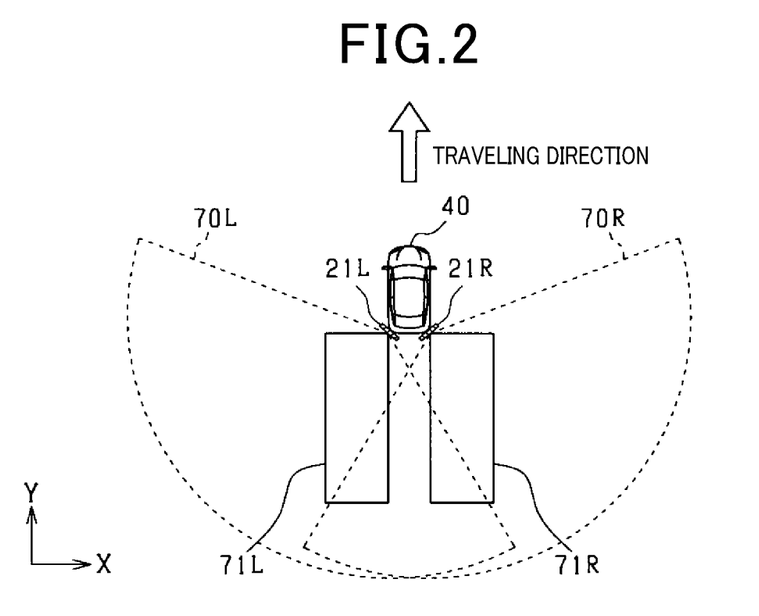
FIG. 2 is a diagram showing object detection areas and warning areas around the host vehicle.

As shown in FIG. 2, the radar devices 21 can detect objects behind and on the left and right rear of the host vehicle 40 by installing one at each of the left and right rear ends of the host vehicle 40. A radar device 21L installed at the left rear end of the host vehicle can detect objects in a detection area 70L. A radar device 21R installed at the right rear end of the host vehicle 40 can detect objects in a detection area 70R.

The various surroundings monitoring devices described above may detect not only objects behind and to the left and right rear of the host vehicle 40 but also objects in front of and/or to the left and right front of the host vehicle 40 and use the detections results as positional information. The object to be monitored may be changed depending on the type of surroundings monitoring device used. For example, when using the imaging device 22, the object may be a stationary object such as a road sign or a building, or a moving object such as a pedestrian. Further, when using the radar device 21, the object may be an object with a large reflected power. It is also possible to change the surroundings monitoring device to be used depending on the type, position, or speed of the object.

The vehicle speed sensor 23 is a sensor that detects the traveling speed of the host vehicle 40, and for example, although it is not limited thereto, a wheel speed sensor that can detect the rotational speed of the wheels can be used. For example, a wheel speed sensor used as the vehicle speed sensor 23 is attached to a wheel and outputs to the ECU a wheel speed signal corresponding to the wheel speed of the vehicle.

The steering angle sensor 24 is attached to, for example, the steering rod of the vehicle and outputs a steering angle signal to the ECU 30 in response to a change in the steering angle of the steering wheel caused by the driver handling it.

The host vehicle may be provided with only one yaw rate sensor 25 or a plurality of yaw rate sensors 25. When only one yaw rate sensor is installed, for example, it is installed at a central part of the host vehicle 40. The yaw rate sensor 25 outputs a yaw rate signal to the ECU 30 according to the rate of change in the amount of steering of the vehicle 40. When a plurality of yaw rate sensors 25 are installed, the average value, intermediate value, or the like of the detected values may be used. Weighting may be performed when calculating the average value or the like of the detected values of the yaw rates.

The receiver 26 is a GPS receiver, and is an example of a GNSS (Global Navigation Satellite System) receiver. The receiver 26 can receive a positioning signal from a satellite positioning system that determines the current position on Earth using an artificial satellite.

The warning device 27 is a device for notifying the driver or the like, and for example, although not limited thereto, an audible notification device such as a speaker or a buzzer installed in the interior of the host vehicle 40, a visual notification device such as a display, or the like. For example, the warning device 27 notifies the driver of the danger of collision with an object by emitting a warning sound or the like based on a control command from the ECU 30. The warning device 27 may be a tactile warning device such as a seat belt device equipped with a pretensioner mechanism that retracts the seat belt. The warning device 27 may be a device that sends notification to the driver or the like by a change in vehicle behavior such as steering control. The warning device 27 may be a device that sends notification to the driver or the like by a change in the vehicle state such as door locking.

The ECU 30 includes a data acquiring part 31, a storage part 32, an object detecting part 33, an area setting part 35, an area changing part 36, and a notification part 37. The ECU 30 includes a CPU, a RAM, a ROM, an I/O device, and the like, and implements these functions by the CPU executing programs installed in the ROM. By doing so, the ECU 30 functions as the driving assistance device providing driving assistance of the host vehicle 40 by creating a control command to the warning device 27 based on the information acquired from the radar devices 21, the imaging device 22, the vehicle speed sensor 23, the steering angle sensor 24, the yaw rate sensor 25, and the receiver 26, and outputting it.

The data acquiring part 31 acquires detection data acquired by the radar devices 21, imaging device 22, and sensors 23 to 25, and the positioning signal received by the receiver 26.

The storage part 32 stores the various kinds of data acquired by the data acquiring part 31 and calculated values calculated based on the various kinds of data. The storage part 32 can also store historical data on the position, turning angle, and the like of the host vehicle 40 on the traveling trajectory of the host vehicle 40. In the storage part 32, the position and turning angle of the host vehicle 40 are associated with each other. The position and turning angle of the host vehicle 40 can be determined from the detected values from the vehicle speed sensor 23, steering angle sensor 24, yaw rate sensor 25, and the like.

The object detecting part 33 is capable of detecting objects behind and/or to the left and/or right rear of the host vehicle 40 based on detection data acquired from surroundings monitoring devices such as the radar devices 21 or the imaging device 22. For example, as shown in FIG. 2, objects on the left and right rear of the host vehicle 40 can be detected based on data regarding object information detected in the detection areas 70L and 70R of the radar devices 21L and 21R.

The area setting part 35 sets a warning area behind and/or on the left and/or right rear of the host vehicle 40. The warning area is set as an area that triggers notification when an object entering the area is detected. The warning area can have any shape and size inside the detection area of the radar device 21. For example, when a warning area is set on each of the left and right rear of the host vehicle 40, like the warning areas 71L and 71R shown in FIG. 2, it is preferable to set band-like areas with a width about the same as that of the traffic lane on the left and right rear of the host vehicle 40.

The area setting part 35 may set the warning area based on information about the lane in which the host vehicle 40 is traveling and an adjacent lane. For example, the warning area may be set based on information on objects around the host vehicle 40 obtained from the imaging device 22 (for example, vehicles and pedestrians around the vehicle, road markings such as division lines, road signs, and the like), and position information, geographic information, traffic information, and the like obtained from the receiver 26.

The area setting part 35 may use information such as road markings and road signs around the vehicle 40 acquired from the imaging device 22, and position information, geographic information, traffic information, and the like of the host vehicle acquired from the receiver 26 to set the warning area.

The area changing part 36 calculates an area reliable distance based on the variation in curvature of the traveling trajectory of the host vehicle 40. The area reliable distance is a distance defining an area in which the traveling trajectory of the host vehicle is highly reliable. The reliability of the traveling trajectory of the host vehicle 40 indicates how well the traveling trajectory of the host vehicle 40 matches a course along the shape of the traveling path of the host vehicle 40. An area in which the traveling trajectory of the host vehicle 40 is highly reliable is an area that is within the area reliable distance from the host vehicle 40.

The course along the shape of the traveling path of the host vehicle 40 may be, for example, a center course of the lane of the host vehicle, which is a course obtained by connecting the centers of the lane in which the host vehicle 40 is traveling in the lane's width direction. When the traveling trajectory of the host vehicle 40 is defined by the traveling trajectory of the center of the host vehicle 40 in the width direction, the better the match between this traveling trajectory and the center course of the lane of the host vehicle, the higher the reliability of the traveling trajectory.

The reliability of the traveling trajectory may be determined based on the variance of the variation in curvature of the traveling trajectory. For example, the variance of the variation in curvature may be calculated along the traveling trajectory, and a position on the traveling trajectory at which the variance is equal to or smaller than a predetermined value may be determined to be a position with high reliability. The area reliable distance may be calculated as the distance between the position on the traveling trajectory at which the variance of the variation in curvature is equal to or smaller than the predetermined value (that is, the position determined to be highly reliable) and the current position of the host vehicle. It is also possible to determine the reliability of the traveling trajectory based on, for example, the position of an inflection point of the traveling trajectory. Specifically, the side closer to the host vehicle 40 than the position of the inflection point on the travel trajectory may be determined to have higher reliability.

The area changing parts 36 sets, based on the area reliable distance, a reference position, which is a position on the traveling trajectory of the host vehicle 40 serving as a reference when changing the warning area. Further, the area changing part 36 changes the rear end of the warning area based on a lateral line extending in the turning radius direction of the host vehicle 40 at the reference position.

The area changing part 36 may change the warning area to a warning determination line set on a lateral line at the current position of the host vehicle 40 when the area reliable distance is shorter than a predetermined distance. Preferably, the larger the angle of deviation between the traveling trajectory of the host vehicle 40 and the course along the traveling path of the host vehicle 40, the longer the warning determination line is set along the lateral line. In addition, preferably, the more the traveling trajectory of the host vehicle 40 is protruded from the course along the traveling path of the host vehicle 40, the shorter the warning determination line is set along the lateral line.

The notification part 37 instructs the warning device 27 to issue a notification when the object detecting part 33 detects an object in the warning area. As an exception, when the area changing part 36 has changed the warning area to the warning determination line, the notification part 37 issues a notification when an object having a movement vector that intersects the warning determination line is detected by the object detecting part 33. Although not shown, driving control (for example, collision avoidance control) of the host vehicle 40 may be executed together with the notification.

Figure 3:
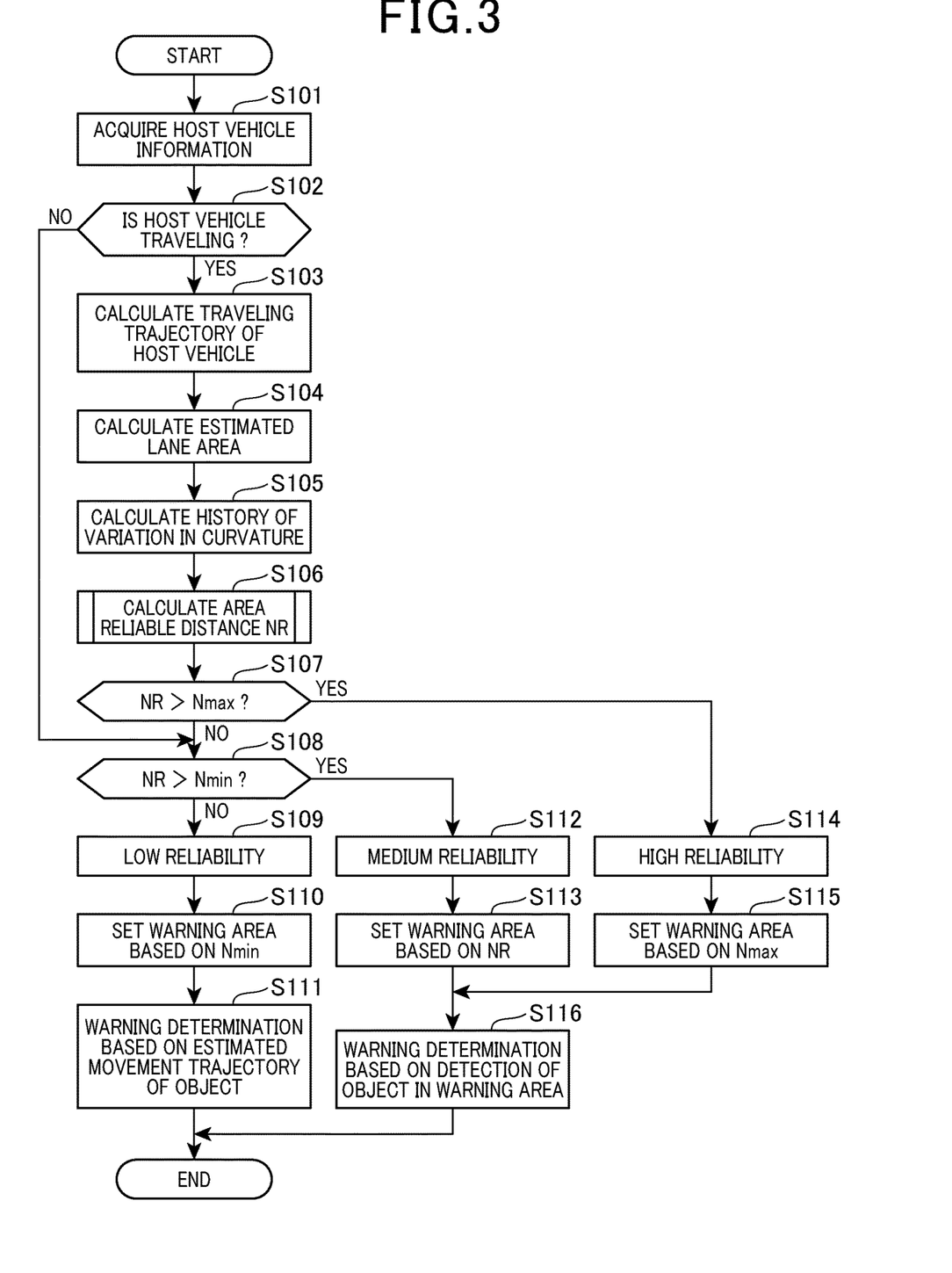
FIG. 3 is a flowchart of a driving assistance control executed by an ECU.

The driving assistance control executed by the ECU 30 will be described with reference to a flowchart of FIG. 3. The process shown in FIG. 3 is repeatedly executed at time intervals of a predetermined duration while the host vehicle 40 is traveling. In FIG. 3 and the related description herein, denotations such as θi are replaced with denotations including parentheses such as θ(i) in order to avoid misunderstandings regarding the parts corresponding to the subscripts.

First, in step S101, vehicle information is obtained. For example, the detection values of various sensors, positioning information, and the like are acquired as appropriate from the radar devices 21, the imaging device 22, the vehicle speed sensor 23, the steering angle sensor 24, the yaw rate sensor 25, and the receiver 26 to acquire information on the traveling state of the host vehicle 40, condition of the lane on which the host vehicle is traveling, and the like. The acquired vehicle information is stored in the ECU 30 as appropriate. The ECU 30 stores information on the position of the host vehicle 40, information on the turning angle of the host vehicle 40, and the like in such a manner that they are associated with each other. The control then proceeds to step S102.

In step S102, whether the host vehicle is traveling is determined. For example, based on the vehicle speed (host vehicle speed) of the host vehicle 40 detected by the vehicle speed sensor 23, it can be determined that the host vehicle 40 is not traveling when the host vehicle speed can be considered to be zero, and determined that the host vehicle 40 is traveling otherwise. When the host vehicle is traveling, the control advances to step S103. When the host vehicle is not traveling, the control advances to step S108.

In step S103, the traveling trajectory of the host vehicle 40 is calculated based on information on the position and turning angle of the host vehicle 40 stored in the ECU 30. The control then proceeds to step S104.

Figure 5:
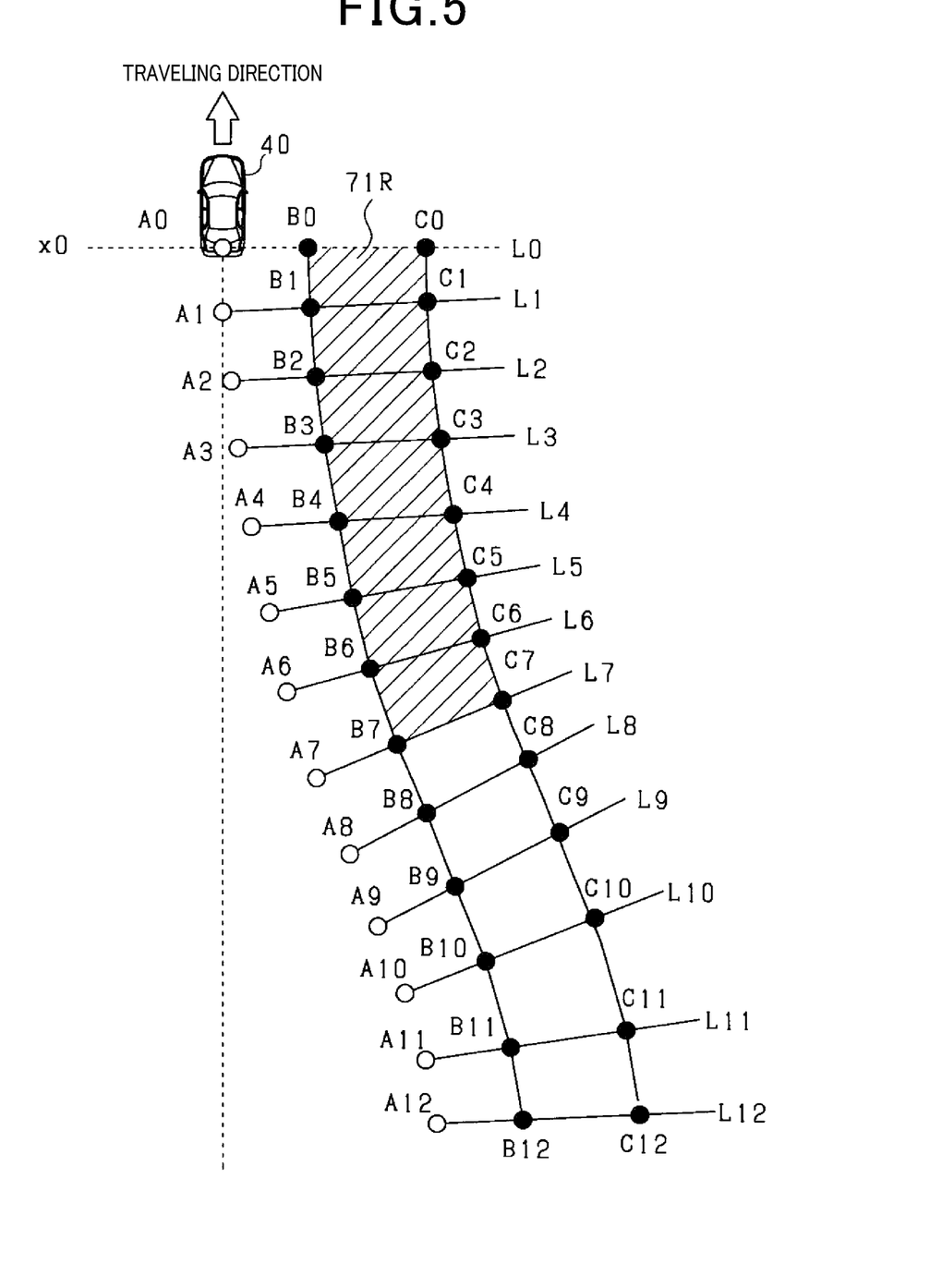
FIG. 5 is a diagram showing an adjacent lane area and warning area on the right rear of the host vehicle.

In step S104, an adjacent lane area is calculated. For example, as shown in FIG. 5, the warning area 71R is set to the right rear of the host vehicle 40. First, a lateral line Li is set based on a turning angle θ(i) of the host vehicle 40 for each point Ai indicating the position of the host vehicle 40 on the traveling trajectory. Then, based on a lane width SH of the host vehicle's lane acquired in step S101, the two ends Bi and Ci of the right rear warning area of the host vehicle 40 are set on the lateral line Li. After calculating the points Ai, Bi, and Ci for i=0 to n, the area surrounded by the points B0 to Bn and C0 to Cn is estimated as the adjacent lane area on the right rear of the host vehicle 40 and the right rear warning area is set. FIG. 5 shows a case where n=12 as an example.

In FIG. 5, points A0 to A12 are on the traveling trajectory of the host vehicle 40. More specifically, they each represent the position of the center point of a line segment connecting the left and right rear wheels of the host vehicle 40 at present or in the past. The point A0 indicates the current position of the host vehicle 40, and A1, A2, ..., and A12 trace back the previous positions of the host vehicle 40 in that order at time intervals of a certain period of time.

The points B0 to B12 and C0 to C12 are points on lateral lines L0 to L12, which are lateral lines extending in the turning radius direction of the host vehicle 40 at the points A0 to A12, respectively. When i=0 to 12, on the lateral lines Li, the distances between the points Ai and points Bi are all Y1, and the distances between the points Bi and points Ci are all Y2.

In the calculation of the adjacent lane area, first, based on the turning angle θi at a point Ai on the traveling trajectory of the host vehicle 40, the lateral line Li extending in the normal direction and passing through the point Ai is set. Then, when the lane width of the host vehicle lane on which the host vehicle 40 is traveling is SH, for example, intervals Y1=SH/2 and Y2=SH are set to estimate the positions of the points Bi and Ci respectively as the left and right edges of the adjacent lane to the right of the host vehicle 40. The area surrounded by the points B0 to B12 and C0 to C12 is estimated as the adjacent lane area. This makes it possible to set an adjacent lane area on the right of the traveling trajectory of the host vehicle 40 with a variable lane width SH that follows a trajectory similar to the traveling trajectory. The estimated adjacent lane area to the right of the host vehicle 40 can be set as the right rear warning area set to the right rear of the current position of the host vehicle 40.

The control proceeds to step S105 after step S104. In step S105, the variation in curvature of the host vehicle 40 at the point Ai indicating the position of the host vehicle on the traveling trajectory is calculated based on the traveling trajectory of the host vehicle 40 calculated in step S103. For example, the history of the variation in curvature of the host vehicle 40 at the point Ai can be calculated based on the turning angle θi at the point Ai on the traveling trajectory of the host vehicle. The control then proceeds to step S106.

Figure 4:
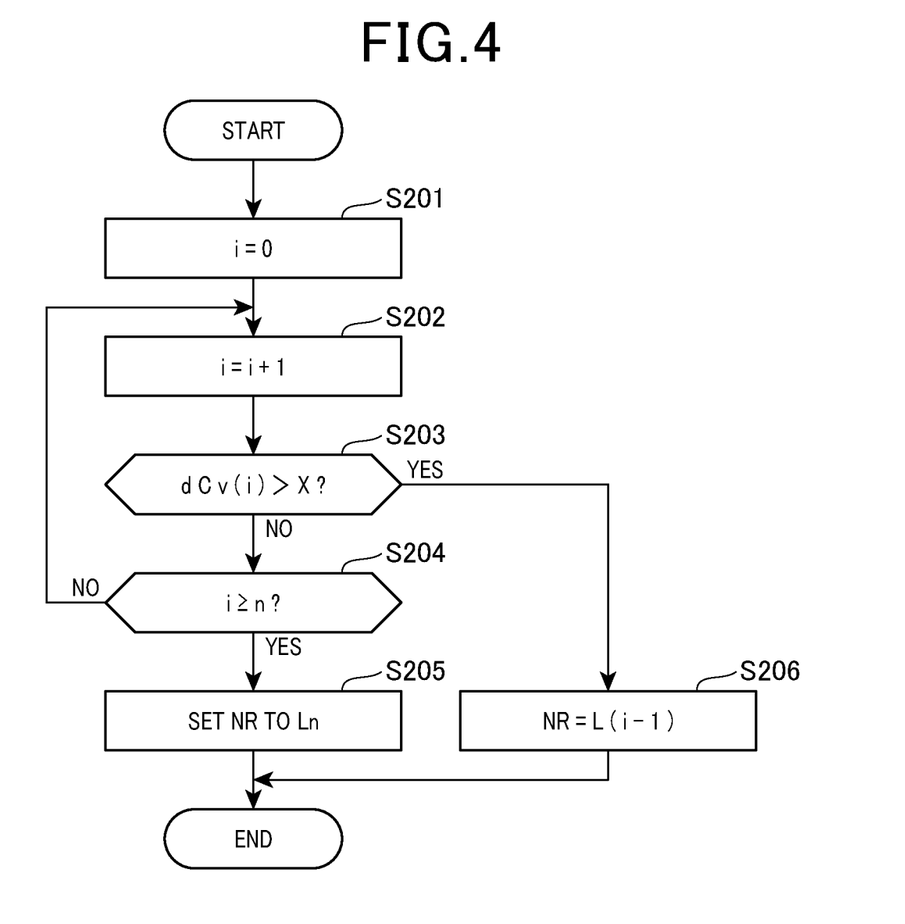
FIG. 4 is a flowchart of a process for calculating the area reliable distance shown in FIG. 3.

In step S106, an area reliable distance NR is calculated by performing the process shown in FIG. 4. As shown in steps S201 to S206, for i=1 to n, the variance dCv(i) of the variation in curvature of the host vehicle 40 at the point Ai is calculated and compared with a predetermined variance threshold X to thereby extract lateral lines Li corresponding to points Ai on the traveling trajectory of the host vehicle at which the variance dCv(i) exceeds X.

The process shown in FIG. 4 is based on a method for determining, based on the knowledge that the curves of roads are designed according to a clothoid, a reliability indicating how well the traveling trajectory of the host vehicle 40 match the course along the shape of the traveling path of the host vehicle 40. In a clothoid, the clothoid parameter indicating the rate of change in curvature is constant. The larger the variance dCv(i) of the variation in curvature, the more it is deviated from the clothoid parameter. Therefore, for the adjacent lane area estimated in step S104, the variance dCv(i) of the variation in curvature and the variance threshold X are compared to determine whether dCv (i)>X holds. The reliability indicating how well the traveling trajectory of the host vehicle 40 match the course along the shape of the traveling path of the host vehicle 40 can thus be evaluated.

Specifically, as shown in step S203, it is determined whether dCv(i)>X for i=1 to n. When it is determined that dCv(i)≤X, the control advances to step S204. In step S204, it is determined whether i≥n holds. When it is determined that i<n, the control returns to step S202, increments i by one, and executes the process of step S203 again. When it is determined in step S204 that i≥n, the control proceeds to step S205 in which the lateral line that gives the area reliable distance NR is set as Ln. On the other hand, when it is determined in step S203 that dCv(i)>X, the control proceeds to step S206 in which the lateral line that indicates the area reliable distance NR is set as L(i-1).

When the minimum value of i satisfying dCv(i)>X is extracted by the process shown in FIG. 4, the lateral line L(i-1), which is closer to the current position of the host vehicle 40 than the corresponding lateral line Li is by one, is chosen as the lateral line that gives the area reliable distance NR. This means that the area extending from the lateral line L0 at the current position of the host vehicle 40 to the lateral line L(i-1) chosen as the area reliable distance NR is an area with high reliability in which the traveling trajectory of the host vehicle 40 and the course along the shape of the traveling path of the host vehicle 40 match well. This also means that the area extending from the lateral lines Li to Ln is an area with lower reliability in which the traveling trajectory of the host vehicle 40 and the course along the shape of the traveling path of the host vehicle 40 do not match well.

On the other hand, when dCv(i)>X is not satisfied for any of i=1 to n, the lateral line Ln is chosen as the lateral line that gives the area reliable distance NR. This means that the entire area extending from the lateral line L0 at the current position of the host vehicle 40 to the lateral line Ln is an area with high reliability in which the traveling trajectory of the host vehicle 40 and the course along the shape of the traveling path of the host vehicle 40 match well.

Returning to FIG. 3, after calculating the area reliable distance NR in step S106, the control proceeds to step S107. In step S107, it is determined whether the area reliable distance NR exceeds a maximum warning distance Nmax. The maximum warning distance Nmax is a distance that is initially set as the distance to the rear end of the warning area.

When it is determined in step S107 that NR≤Nmax, the control proceeds to step S108. In step S108, it is determined whether the area reliable distance NR exceeds a minimum warning distance Nmin. The minimum warning distance Nmin is a distance set in consideration of a possible situation in which the warning area is inappropriately set. The warning area may be inappropriately set when the host vehicle does not travel along the shape of the traveling path, such as when it is changing lanes, parking, or stopping. In these cases, the area reliable distance NR decreases.

When NR≤Nmax, the control advances to steps S109 and S110 to set the warning area based on the minimum warning distance Nmin. When NR≤Nmax, the warning area may be inappropriately set if the host vehicle does not travel along the shape of the traveling path, such as when it changes lanes, parks, or stops. Therefore, a warning determination line set on the lateral line L0 at the current position of the host vehicle 40 is set as the warning area. The control then proceeds to step S111.

In step S111, warning determination is carried out based on the estimated movement trajectory of an object. In this warning determination, notification is issued not only when an object has actually crossed the warning determination line set as the warning area but also when an object having a movement vector that intersects the warning determination line is detected. After that, the process is terminated.

On the other hand, when NR≥Nmax in step S107, the control proceeds to steps S112 and S113 in which the point on the traveling trajectory of the host vehicle 40 corresponding to the area reliable distance NR is set as a reference position. The area extending from the lateral line L0 at the current position of the host vehicle 40 to the lateral line at the point on the traveling trajectory of the host vehicle 40 corresponding to the area reliable distance NR is set as the warning area. The control then proceeds to step S116.

Using FIG. 5 to explain this by way of example, the area surrounded by the points B0 to B12 and C0 to C12, which is the area set as the right rear warning area in step S104, is the initially set warning area. When the process of step S106 is carried out and L7 is determined to be the lateral line at the point on the traveling trajectory of the host vehicle 40 corresponding to the area reliable distance NR, in step S113, the rear end of the right rear warning area is set to the lateral line L7 so that the shaded warning area 72R is narrowed. The warning area 71R has a substantially annular sector shape and is surrounded by the points B0 to B7 and C0 to C7.

When NR>Nmax in step S107, the control proceeds to steps S114 and S115 in which the point on the traveling trajectory of the host vehicle 40 corresponding to the maximum warning distance Nmax is set as a reference position. The area extending from the lateral line L0 at the current position of the host vehicle 40 to the lateral line at the point on the traveling trajectory of the host vehicle 40 corresponding to the maximum warning distance Nmax is set as the warning area. The control then proceeds to step S116.

Using FIG. 5 to explain this by way of example, after the area surrounded by points B0 to B12 and C0 to C12, which is the area set as the right rear warning area in step S104, is set as the initially sett warning area, the control proceeds to step S115 in which the rear end of the right rear warning area is set to the initially set lateral line L12. This means that the initially set warning area is maintained. In this case, the warning area has a substantially annular sector shape and is surrounded by the points B0 to B12 and C0 to C12.

In step S116, warning determination is carried out based on detection of objects in the warning area. In this warning determination, a notification is issued when an object is detected in the warning area. After that, the process is terminated.

According to the above embodiment, the warning area is changed based on the reliability of the traveling trajectory of the host vehicle 40 as indicated by steps S107 to S116. When the reliability is high, the warning area is not narrowed from the size it was initially set with, and a notification is issued when an object is detected within the warning area. When the reliability is medium, the warning area is limited to an area with high reliability defined by the area reliable distance NR, and a notification is issued when an object is detected within the limited warning area. When the reliability is low, the warning area is changed to the warning determination line, and a notification is issued when an object having a movement vector that intersects the warning determination line is detected. The reference position is a position on the traveling trajectory of the host vehicle that serves as a reference for changing the warning area. Since the reference position is set based on the area reliable distance calculated based on the variation in curvature of the traveling trajectory of the host vehicle 40, the reference position can be set so that the effects imposed when the host vehicle 40 does not travel along the traveling path are alleviated, and the influence of the traveling speed of the host vehicle 40 when making a turn is avoided.

Although in steps S105 and S106 the area reliable distance is calculated, based on the knowledge that roads are designed as clothoids, from the variance of the variation in curvature of the traveling trajectory of the host vehicle 40, the calculation is not limited to this. The area reliable distance may be calculated using another method that can evaluate how well the course along the traveling path of the host vehicle 40 match the traveling trajectory of the host vehicle 40. For example, when the position of the inflection point currently closest to the host vehicle 40 among the inflection points along the traveling path of the host vehicle 40 is the position of the lateral line L8, the area reliable distance NR may be set at the position corresponding to i=7.

Further, although it is possible to set the lateral line L7 corresponding to the area reliable distance NR as the rear end of the warning area in step S113 as shown in FIG. 5, for example, the present invention is not limited to this. Considering the margin, the rear end of the warning area may be set at a position closer to the current position of the host vehicle 40 than the lateral line L7 is by a predetermined distance. The marginal distance to be secured can be set based on, for example, the time or distance interval between points Ai, which are positions of the host vehicle 40 acquired as data. Specifically, a long marginal distance may be secured when the time or distance interval between points Ai is short.

Figure 6:
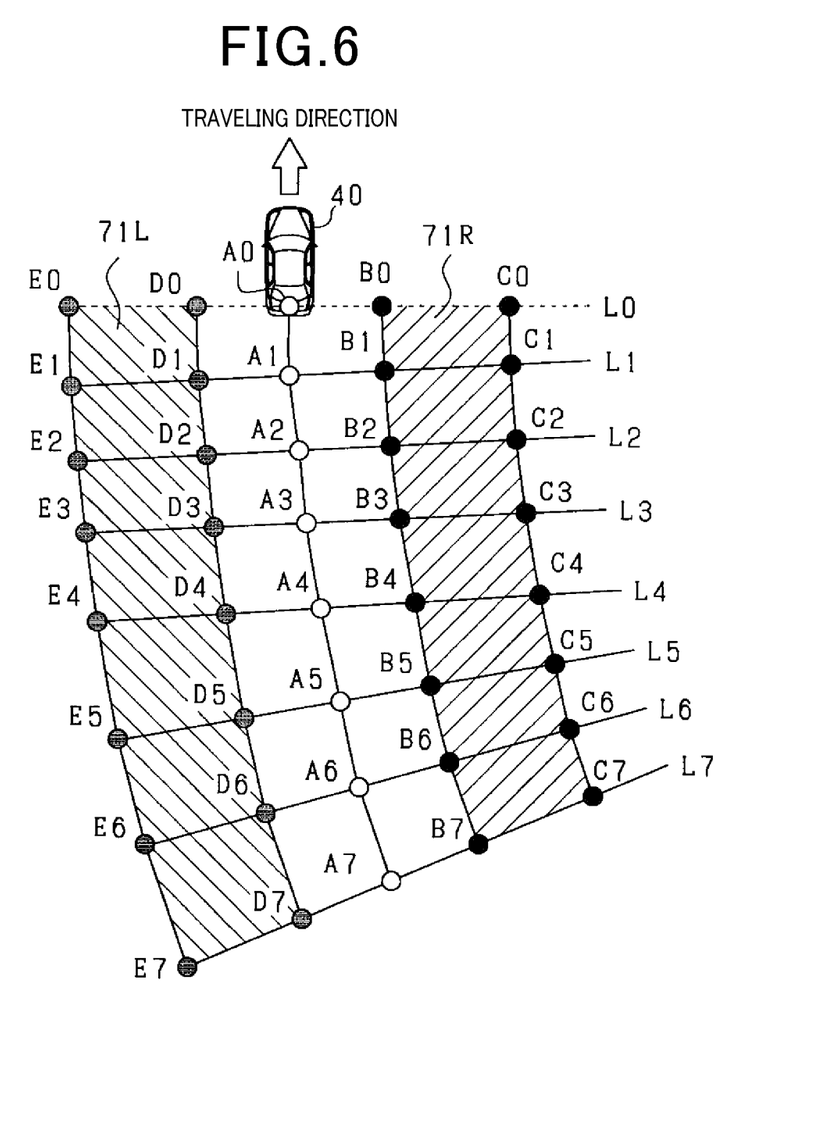
FIG. 6 is a diagram showing warning areas on the left and right rear of the host vehicle.

As shown in FIG. 6, the warning area 71L, which is the left rear warning area set to the left rear of the host vehicle 40, can also be set or changed similarly to the warning area 71R, which is the right rear warning area. The area setting part 35 linearly extends the lateral lines L0 to L12 shown in FIG. 5 to the left of the traveling trajectory of the host vehicle 40 and sets points D0 to D12 and E0 to E12 on the lateral lines L0 to L12. On the lateral lines Li, the distances between the points Ai and points Di are all Y3, and the distances between the points Bi and Ei are all Y4. In FIG. 6, only i=0 to 7 are illustrated, and i=8 to 12 are omitted.

When the lane width of the host vehicle lane on which the host vehicle 40 is traveling is SH, for example, intervals Y3=SH/2 and Y4=SH are set to estimate the positions of the points Di and Ei respectively as the right and left edges of the adjacent lane to the left of the host vehicle 40. The area surrounded by the points D0 to D12 and E0 to E12 is estimated as the adjacent lane area. This makes it possible to set an adjacent lane area to the left of the traveling trajectory of the host vehicle 40 with a variable lane width SH that follows a trajectory similar to the traveling trajectory. The estimated adjacent lane area to the left of the host vehicle 40 is set by the area setting part 35 as the left rear warning area set to the left rear of the current position of the host vehicle 40.

Note that the values of Y1 to Y4 may be set based on the lane width SH of the host lane as described above, or may be set based on the actual lane width of the adjacent lane. The lane width may be actually measured by detecting the white lines with the imaging device 22, or may be obtained by the receiver 26, which is a GPS receiver.

When the lateral line L7 corresponding to the area reliable distance NR has been set as the rear end of the warning area in step S113, the area changing part 36 changes the left rear warning area to a warning area 71L with the lateral line L7 serving as the rear end thereof. The warning area 71L has a substantially annular sector shape and is surrounded by the points D0 to D7 and E0 to E7.

As shown in FIG. 6, the warning areas 71R and 71L are changed into a substantially annular sector shape centered on the turning center of the host vehicle 40. As a result, when the host vehicle 40 makes a turn, the warning area is narrower on the inner side and wider on the outer side. Specifically, when the host vehicle 40 turns right (clockwise) as shown in FIG. 6, the warning area 71R on the inner side when the host vehicle 40 is making the turn is narrower than the warning area 71L on the outer side when the host vehicle 40 is making the turn. The same applies to the shape of each of the warning areas 71R and 71L, and they have a substantially annular sector shape that is wider on the outer side and narrower on the inner side when the host vehicle 40 is making a turn. According to the area setting part 35 and the area changing part 36, the warning area can be changed to a more appropriate area according to the shape of the road on which the host vehicle 40 is making a turn.

Further, after reaching the state shown in FIG. 6, when the host vehicle 40 continues to travel with the variation in curvature staying below the variation threshold, the warning areas 71R and 71L are extended to the front of the lateral line L0 according to the traveling of the host vehicle 40. For example, when the host vehicle 40 continues to travel straight, the lateral line at a future position of the host vehicle 40 will be parallel to L0. Therefore, the warning areas 71R and 71L are extended to the front of the lateral line L0 according to the traveling of the host vehicle 40. After the warning areas have been narrowed like the warning areas 71R and 71L shown in FIG. 6 in response to the host vehicle 40 starting to make a turn, the size of the warning areas can be restored to that in the state where the vehicle is traveling straight without having to determine that the host vehicle 40 has completed the turn.

Figure 7:
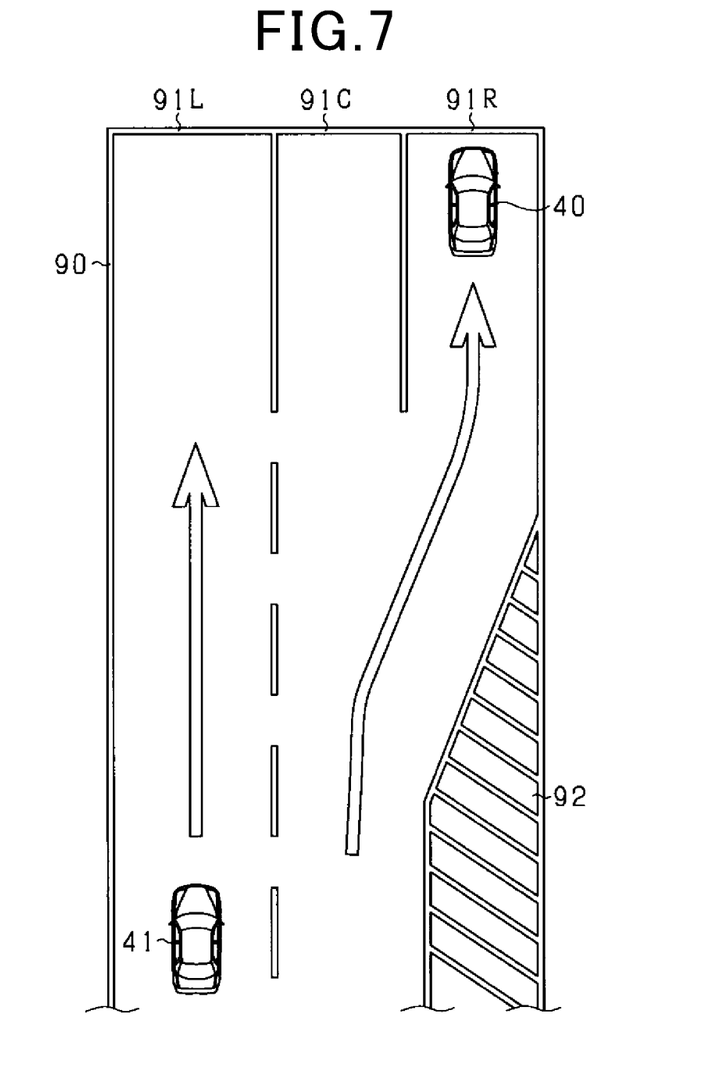
FIG. 7 is a diagram showing object detection areas around the host vehicle.
Figure 8:
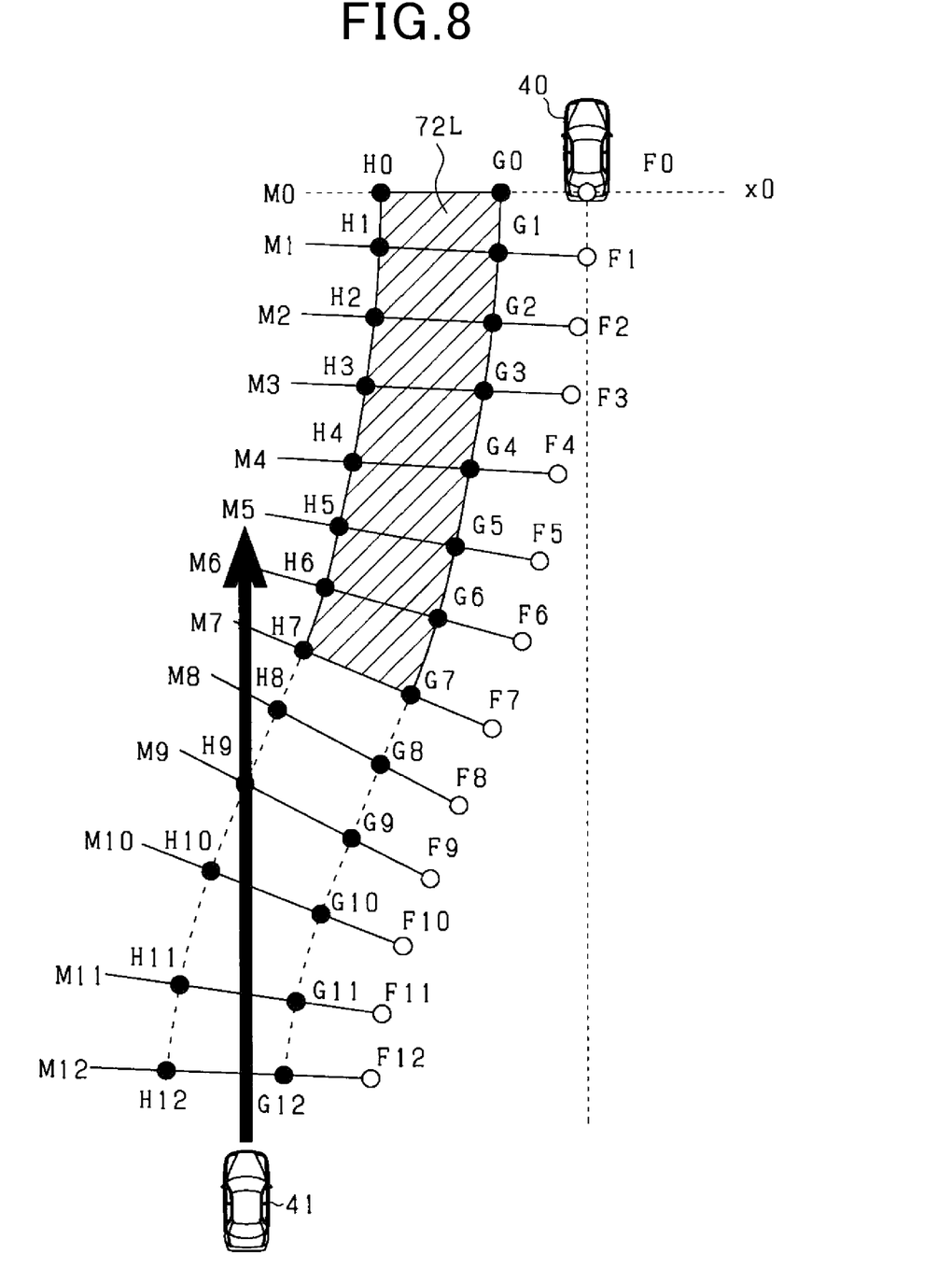
FIG. 8 is a diagram showing warning areas behind and to the left and/or right rear of the host vehicle.

According to the above embodiment, the warning area can be appropriately changed even when the host vehicle 40 is stopped or traveling at a slow speed. For example, as shown in FIG. 7, when the host vehicle 40 traveling in the center lane 91C on a three-lane road 90 changes to a right lane 91R that is a right turn lane and stops, a technique that changes the warning area based on the assumption that the host vehicle 40 is traveling may not be able to change the warning area appropriately. For example, as shown in FIG. 8, the warning area surrounded by points G0 to G12 and H0 to H12 may not be able to be changed because the host vehicle 40 is stopped. As shown in FIG. 7, another vehicle 41 traveling in a left lane 91L is not an appropriate warning target for the host vehicle 40 stopped in the right lane 91R. However, if the warning area surrounded by the points G0 to G12 and H0 to H12 is maintained as shown in FIG. 8, the other vehicle 41 is detected within the warning area and a notification is issued. According to the embodiment described above, since the warning area can be changed based on the variation in curvature of the traveling trajectory of the host vehicle 40, even when the host vehicle 40 is stopped, the warning area can be appropriately narrowed as with the warning area 72L shown in FIG. 8, making it possible to prevent the other vehicle 41 from being detected and a notification being issued.

Figure 9:
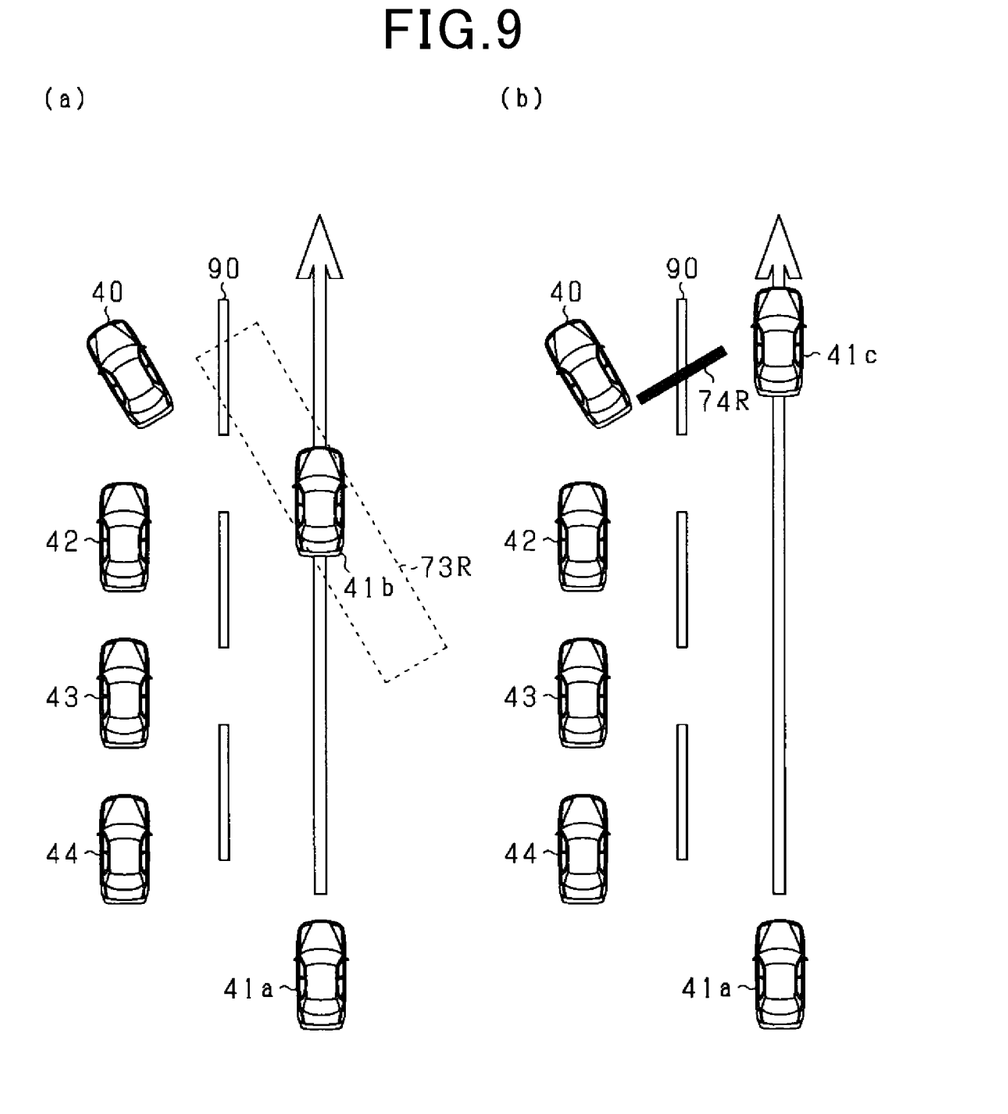
FIG. 9 is a diagram comparing the warning area and the warning determination line.

Further, according to the above embodiment, as shown in steps S109 to S111, when the reliability of the traveling trajectory of the host vehicle 40 is low, a notification is issued when an object having a movement vector that intersects with the warning determination line is detected. Therefore, as shown in FIG. 9, for example, when the direction of the host vehicle 40 is clearly tilted with respect to the course along the traveling path of the host vehicle 40, a warning notification can be appropriately issued. When the direction of the host vehicle 40 is tilted approximately 45 degrees to the left with respect to the traveling path of the host vehicle 40, as shown in FIG. 9(a), if the warning area 73R is set to the right rear of the host vehicle 40, the warning area 73R would be set diagonally with respect to the traveling path. As a result, a notification would be issued when another vehicle 41 that is traveling far from the host vehicle 40 and is not an appropriate warning target reaches the position indicated by another vehicle 41b. On the other hand, as shown in FIG. 9(b), if the warning area is changed to the warning determination line 74R, even when the other vehicle 41 travels from the position indicated by another vehicle 41a to the position indicated by another vehicle 41c, this would not be detected as an object for which notification is required. When issuing a notification using the warning determination line 74R, the notification part 37 is configured to issue a notification when the movement vector of the other vehicle 41 intersects with the warning determination line 74R. The movement vector can be estimated from the point in time when the other vehicle 41 is at the position of the other vehicle 41a in order to determine whether it intersects with the warning determination line 74R. Therefore, even in a situation where the other vehicle 41c would be detected on the warning determination line 74R, it is possible to determine whether to issue a notification at the earlier point in time of the other vehicle 41a, which prevents the notification from becoming too late.

Preferably, the larger the angle of deviation $\alpha$ between the traveling trajectory of the host vehicle 40 and the course along the traveling path of the host vehicle 40, the longer the warning determination line is set along the lateral line L0. For example, in FIG. 9(b), when the length of the warning determination line 74R in the direction of the lateral line L0 is LA, a length Lx of the warning line 74R in the width direction of the traveling path is calculated by LA×cos $\alpha$. This means that the larger the angle of deviation $\alpha$, the smaller the length Lx. In order to ensure that the length Lx is large enough, preferably, the larger the angle of deviation $\alpha$, the larger the length LA is set.

In addition, preferably, the more the traveling trajectory of the host vehicle 40 is protruded from the course along the traveling path of the host vehicle 40, the shorter the warning determination line is set along the lateral line L0. For example, as shown in FIG. 9(*b*), when the right end position (right rear corner position) of the host vehicle 40 is protruded to the right from the right end position (right side face position) of vehicles 42 to 44 following the host vehicle 40, preferably, the larger the amount of protrusion, the smaller the length LA of the warning determination line 74R.

Figure 10:
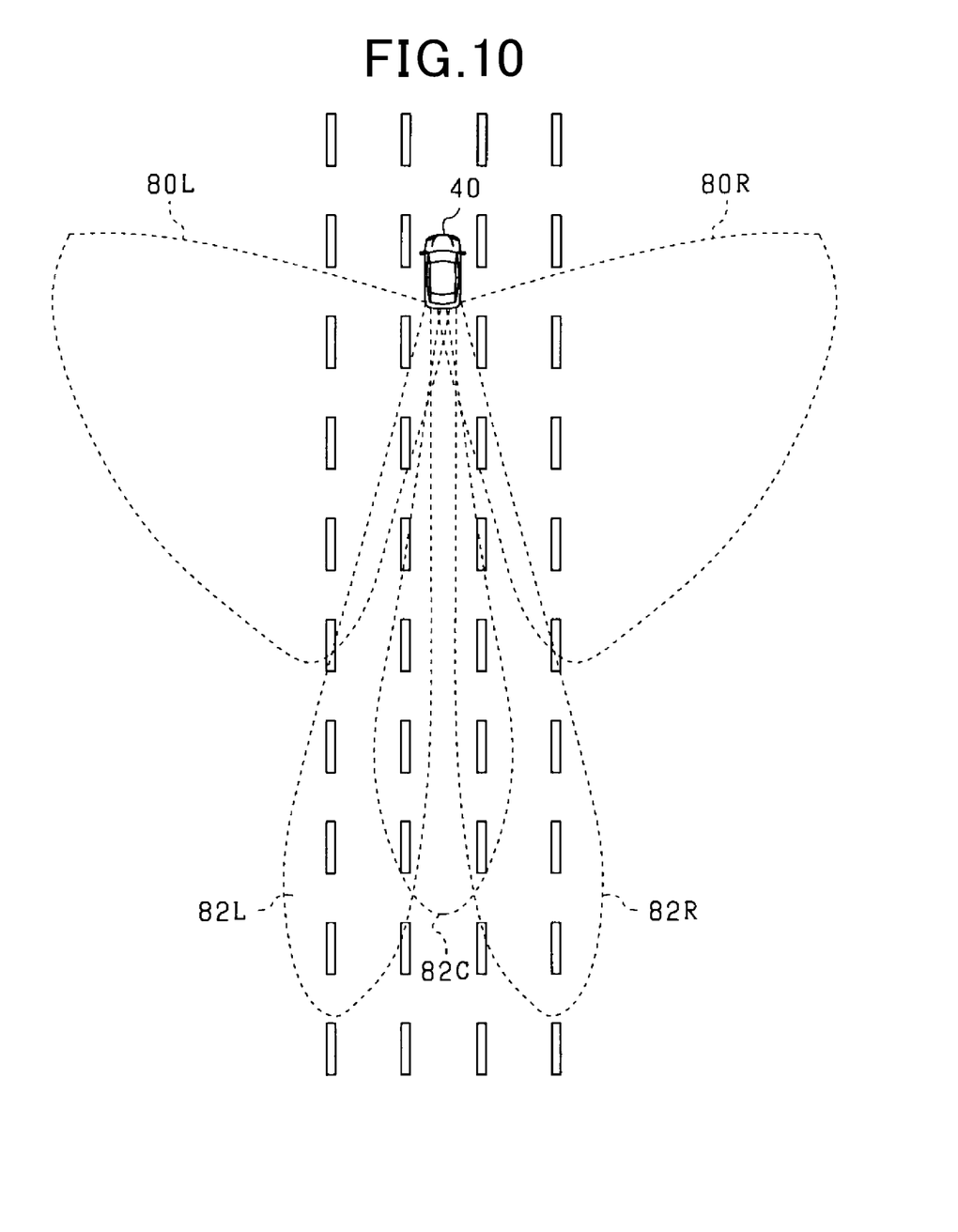
FIG. 10 is a diagram showing object detection areas around the host vehicle.

In the above embodiment, an example was described in which warning areas 71L and 71R are set on both the left and right rear of the host vehicle 40 based on the detection areas 70L and 70R of the radar devices 21L and 21R, but the present invention is not limited to this. As shown in FIG. 10, in addition to detection areas 80L and 80R that extend laterally to the left rear and right rear of the host vehicle 40, the detection region of the object detection part 33 may include a detection area 82C extending to the rear of the host vehicle 40 and detection areas 82L and 82R on the left and right of the detection area 82C that are also extending to the rear. The detection areas 80L and 80R can be suitably used for a rear vehicle approach warning to detect a vehicle or the like present in a rear blind spot and notify the driver of it. More specifically, it can be suitably used in the case where the connection with a trailer is automatically detected to expand the warning area, or in the case where a vehicle approaching the host vehicle 40 is detected to notify the driver who opens the door to exit the vehicle of it. The detection area 82C can be suitably used to flash the hazard lights to notify a following vehicle of the danger of a collision. The detection areas 82L and 82R can be suitably used when a vehicle approaching from behind is to be detected to notify the driver of it.

Figure 11:
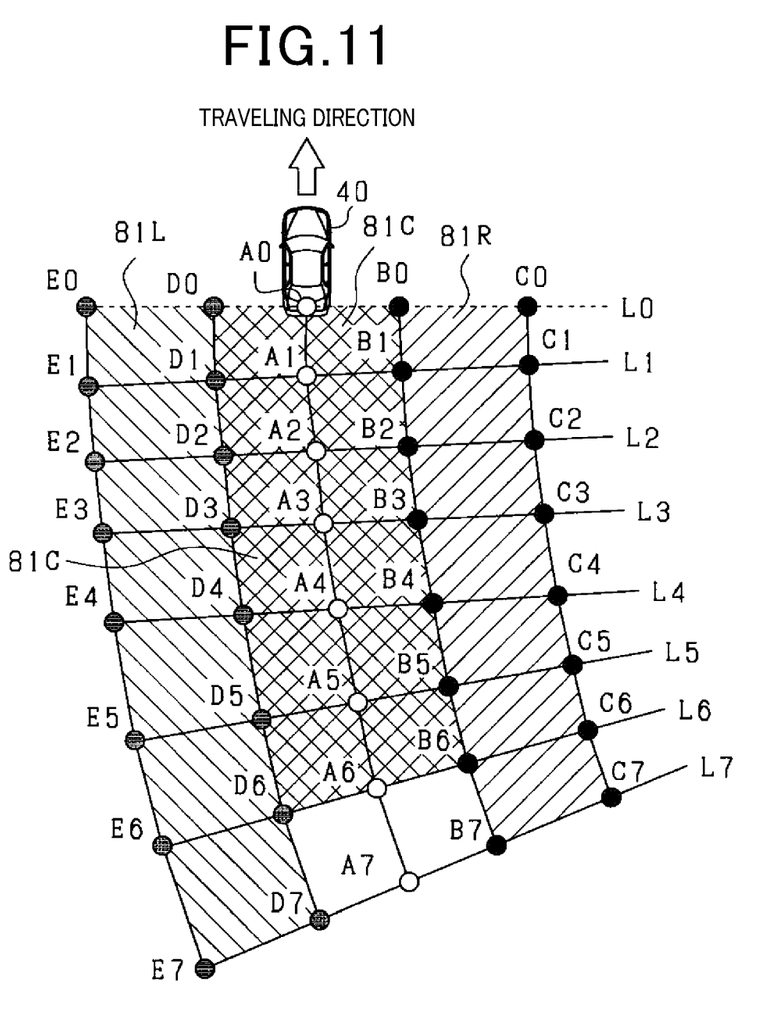
FIG. 11 is a diagram showing warning areas behind and to the left and/or right rear of the host vehicle.

For example, as shown in FIG. 11, a warning area 81C may set behind the host vehicle 40. As shown in FIG. 11, the rear center warning area 81C is preferably set in between the right rear warning area 81R and the left rear warning area 81L of the host vehicle 40.

Further, the rear end position of the rear warning area 81C of the host vehicle 40 may be determined as with the right rear warning area 81R and the left rear warning area 81L of the host vehicle 40, or determined to be at a different position. For example, as shown in FIG. 11, the right rear warning area 81R and the left rear warning area 81L are changed so that the lateral line L7 serves as their rear end, whereas the rear center warning area 81C is changed so that the lateral line L6, which is closer to the current position of the vehicle 40, serves as its rear end.

The above embodiments provide the following effects.

The ECU 30 has a function as a driving assistance device that performs driving assistance based on information about objects detected around the host vehicle 40, and includes the object detecting part 33, area setting part 35, area changing part 36, and notification part 37. The object detecting part 33 detects objects behind and/or to the left and/or right rear of the host vehicle 40. The area setting part 35 sets a warning area behind and/or on the left and/or right rear of the host vehicle 40.

The area changing part 36 calculates the area reliable distance NR defining an area with a high reliability based on the variation in curvature of the traveling trajectory of the host vehicle 40. The reliability indicates how well the traveling trajectory of the host vehicle 40 matches the course along the shape of the traveling path of the host vehicle 40. The area changing parts 36 also sets, based on the area reliable distance NR, a reference position, which is a position on the traveling trajectory of the host vehicle 40 serving as a reference when changing the warning area. The rear end of the warning area is changed based on a lateral line extending in the turning radius direction of the host vehicle 40 at the reference position. The notification part 37 issues a notification when the object detecting part 33 detects an object in the warning area. According to the area changing part 36, the area reliable distance NR is calculated from the variation in curvature of the traveling trajectory of the host vehicle 40. The reference position, which is the position on the traveling trajectory of the host vehicle 40 that serves as the reference for changing the warning area, is set based on the calculated area reliable distance NR. Therefore, the reference position can be set so that the effects imposed when the host vehicle 40 does not travel along the traveling path are alleviated, and the influence of the traveling speed of the host vehicle 40 when making a turn is avoided. The area changing part 36 changes the rear end of the warning area based on a lateral line extending in the turning radius direction of the host vehicle 40 at the reference position. Since the lateral lines extend radially from the turning center of the host vehicle 40, when the rear end of the warning area is set based on the same lateral line, the warning area is changed to a substantially annular sector shape centered on the turning center of the host vehicle 40. As a result, for example, when the host vehicle 40 makes a turn, the warning area is narrower on the inner side of the host vehicle 40 and wider on the outer side of host vehicle 40, and the warning area can be changed as appropriate according to the shape of the road on which the host vehicle 40 is turning.

The area changing part 36 may change the warning area to a warning determination line set on the lateral line L0 at the current position of the host vehicle 40 when the area reliable distance NR is shorter than a predetermined distance (for example, the minimum warning distance Nmin). In this case, the notification part 37 is preferably configured to issue a notification when an object having a movement vector that intersects the warning determination line is detected.

Preferably, the larger the angle of deviation between the traveling trajectory of the host vehicle 40 and the course along the traveling path of the host vehicle 40, the longer the warning determination line is set along the lateral line. Alternatively, preferably, the more the traveling trajectory of the host vehicle 40 is protruded in from the course along the traveling path of the host vehicle 40, the shorter the warning determination line is set along the lateral line.

The area changing part 36 may be configured to calculate the area reliable distance NR from the variance dCv(i) of the variation in curvature of the traveling trajectory. The smaller the variance dCv(i) is and the closer the variation in curvature is to the clothoid parameter, the higher the reliability of the traveling trajectory of the host vehicle 40. Therefore, for example, among the positions where the variance dCv(i) exceeds a predetermined variance threshold X, the position closest to the host vehicle 40 can be extracted, and the side closer to the host vehicle 40 than the extracted position is can be determined to be highly reliable.

The area changing part 36 may be configured to calculate the area reliable distance NR from an inflection point of the traveling trajectory. For example, among the inflection points on the travel trajectory of the host vehicle 40, the inflection point closest to the host vehicle 40 can be extracted, and the side closer than the extracted inflection point can be determined to be have high reliability.

Controllers and methods thereof described in the present disclosure may be implemented by a dedicated computer provided by configuring a processor and memory programmed to perform one or more functions embodied by a computer program. Alternatively, controllers and methods thereof described in this present disclosure may be implemented by a dedicated computer provided by configuring a processor with one or more dedicated hardware logic circuits. Alternatively, controllers and methods thereof described in the present disclosure may be implemented by one or more dedicated computers configured by combining a processor and memory programmed to perform one or more functions with a processor including one or more hardware logic circuits. The computer program may be stored in a tangible computer-readable non-transitory memory medium as instructions executed by a computer.

The present disclosure has been described in accordance with the embodiment, but the present disclosure should in no way be construed as being limited to the embodiment, the configuration, and the like. The present disclosure includes many variations, and modifications within the range of equivalency. In addition to various combinations and forms, other combinations and forms including one or more/less elements thereof are also within the spirit and scope of the present disclosure.

CONCLUSION

The present disclosure aims to alleviate the effects imposed when the host vehicle does not travel along the traveling path to avoid the influence of the traveling speed of the host vehicle when making a turn and properly set the warning area.

A driving assistance device according to the present disclosure includes: an object detecting part that detects an object behind and/or to the left and/or right rear of a host vehicle; an area setting part that sets a warning area behind and/or to the left or right rear of the host vehicle; a notification part that issues a notification when an object is detected within the warning area by the object detecting part; and an area changing part that calculates, based on a variation in curvature of a traveling trajectory of the host vehicle, an area reliable distance defining an area with high reliability, the reliability indicating how well the traveling trajectory matches a course along a shape of a traveling path of the host vehicle, based on the area reliable distance, sets a reference position that is a position on the traveling trajectory of the host vehicle serving as a reference for changing the warning area, and based on a lateral line extending in a turning radius direction of the host vehicle at the reference position, changes a rear end of the warning area.

According to the present disclosure, the area changing part calculates the area reliable distance. The area reliable distance is a distance within which the reliability of the traveling trajectory defines an area. The reliability indicates how well the traveling trajectory matches the course along the shape of the traveling path of the host vehicle. Since the area reliable distance is calculated from the variation in curvature of the traveling trajectory of the host vehicle, and the reference position, which is the position on the traveling trajectory of the host vehicle serving as a reference for changing the warning area, is set based on the calculated area reliable distance, the reference position can be set so that the effects imposed when the host vehicle does not travel along the traveling path are alleviated, and the influence of the traveling speed of the host vehicle when making a turn is avoided. The area changing part changes the rear end of the warning area based on a lateral line extending in the turning radius direction of the host vehicle at the reference position. Since the lateral lines extend radially from the turning center of the host vehicle, when the rear end of the warning area is set based on the same lateral line, the warning area is changed to a substantially annular sector shape centered on the turning center of the host vehicle. As a result, for example, when the host vehicle makes a turn, the warning area is narrower on the inner side of the host vehicle and wider on the outer side of host vehicle, and the warning area can be changed as appropriate according to the shape of the road on which the host vehicle is turning.

What is claimed is:

1. A driving assistance device comprising:
   an object detecting part that detects an object behind and/or to the left and/or right rear of a host vehicle;
   an area setting part that sets a warning area behind and/or to the left or right rear of the host vehicle;
   a notification part that issues a notification when an object is detected within the warning area by the object detecting part; and
   an area changing part that calculates, based on a variation in curvature of a traveling trajectory of the host vehicle, an area reliable distance defining an area with high reliability, the reliability indicating how well the traveling trajectory matches a course along a shape of a traveling path of the host vehicle, based on the area reliable distance, sets a reference position that is a position on the traveling trajectory of the host vehicle serving as a reference for changing the warning area, and based on a lateral line extending in a turning radius direction of the host vehicle at the reference position, changes a rear end of the warning area.

2. The driving assistance device according to claim 1, wherein
   when the area reliable distance is closer than a predetermined distance, the area changing part changes the warning area to a warning determination line set on the lateral line at a current position of the host vehicle, and
   the notification part issues a notification when the object having a movement vector that intersects the warning determination line is detected.

3. The driving assistance device according to claim 1, wherein
   the area changing part calculates the area reliable distance from a variance of the variation in curvature of the traveling trajectory.

4. The driving assistance device according to claim 1, wherein
   the area changing part calculates the area reliable distance from an inflection point of the traveling trajectory.

5. The driving assistance device according to claim 1, wherein
   when the area reliable distance is closer than a predetermined distance, the area changing part changes the warning area to a warning determination line set on the lateral line at a current position of the host vehicle,
   the larger an angle of deviation of the traveling trajectory of the host vehicle from the course along the traveling path of the host vehicle, the longer the warning determination line is set, and
   the notification part issues a notification when the object having a movement vector that intersects the warning determination line is detected.

6. The driving assistance device according to claim 1, wherein
   when the area reliable distance is closer than a predetermined distance, the area changing part changes the warning area to a warning determination line set on the lateral line at a current position of the host vehicle, and the more the traveling trajectory of the host vehicle is protruded from the course along the traveling path of the host vehicle, the shorter the warning determination line is set, and the notification part issues a notification when the object having a movement vector that intersects the warning determination line is detected.

* * * * *